US009159298B2

(12) United States Patent
Han et al.

(10) Patent No.: US 9,159,298 B2
(45) Date of Patent: Oct. 13, 2015

(54) TERMINAL AND CONTENTS SHARING METHOD FOR TERMINAL

(75) Inventors: Hyoyoung Han, Seoul (KR); Jungjae Yun, Seoul (KR); Jungeun Song, Incheon (KR); Hansu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 13/085,223

(22) Filed: Apr. 12, 2011

(65) Prior Publication Data

US 2012/0060109 A1    Mar. 8, 2012

(30) Foreign Application Priority Data

Sep. 8, 2010    (KR) .................. 10-2010-0088129
Sep. 15, 2010   (KR) .................. 10-2010-0090782

(51) Int. Cl.
  *G06F 3/0486*    (2013.01)
  *G09G 5/14*      (2006.01)
  *G06F 3/14*      (2006.01)

(52) U.S. Cl.
  CPC ............. *G09G 5/14* (2013.01); *G06F 3/1454* (2013.01); *G06F 3/1423* (2013.01); *G09G 2340/145* (2013.01); *G09G 2370/16* (2013.01)

(58) Field of Classification Search
  None
  See application file for complete search history.

(56) References Cited

U.S. PATENT DOCUMENTS

| 2004/0222983 | A1  |         | 11/2004 | Kakemura                    |
| 2005/0091302 | A1  | *       | 4/2005  | Soin et al. ......... 709/200 |
| 2005/0091610 | A1  | *       | 4/2005  | Frei et al. ......... 715/804 |
| 2007/0136466 | A1  | *       | 6/2007  | Etelapera ........... 709/225 |
| 2007/0162866 | A1  | *       | 7/2007  | Matthews et al. ..... 715/769 |
| 2008/0016461 | A1  | *       | 1/2008  | Hoblit .............. 715/788 |
| 2008/0165153 | A1  |         | 7/2008  | Platzer et al.              |
| 2009/0023395 | A1  | *       | 1/2009  | Chang et al. ........ 455/74.1 |
| 2010/0118200 | A1  | *       | 5/2010  | Gelman et al. ....... 348/578 |
| 2010/0138780 | A1  | *       | 6/2010  | Marano et al. ....... 715/804 |
| 2010/0164839 | A1  |         | 7/2010  | Lyons et al.                |
| 2010/0299436 | A1  | *       | 11/2010 | Khalid et al. ....... 709/226 |

FOREIGN PATENT DOCUMENTS

| EP | 1 858 238 A2   | 11/2007 |
| WO | 2006/043977 A1 | 4/2006  |
| WO | 2009/036366 A1 | 3/2009  |

* cited by examiner

*Primary Examiner* — William Bashore
*Assistant Examiner* — Hien Duong
(74) *Attorney, Agent, or Firm* — Birch, Stewart, Kolasch & Birch, LLP

(57) ABSTRACT

Disclosed is a terminal and corresponding control method, one embodiment of the terminal including a display unit; a wireless communication unit configured to form a network with at least one external terminal; and a controller configured to set up at least two second display regions displayed on a first display region of the external terminal, and control the wireless communication unit to transmit information corresponding to the second display regions to the external terminal.

29 Claims, 20 Drawing Sheets (a)          (b)

TERMINAL AND CONTENTS SHARING METHOD FOR TERMINAL

CROSS REFERENCE TO RELATED APPLICATIONS

Pursuant to 35 U.S.C. §119(a), this application claims the benefit of an earlier filing date and a right of priority to Korean Application No. 10-2010-0088129, filed on Sep. 8, 2010, and Korean Application No. 10-2010-0090782, filed on Sep. 15, 2010, the contents of both being incorporated herein by reference in their entirety.

BACKGROUND OF THE INVENTION

1. Field of the Invention

The present disclosure relates to a terminal and a contents sharing method for the terminal.

2. Description of the Related Art

In recent years, N-screen play services have been developed such that a terminal such as a television, a personal computer, a portable phone, and the like is connected via a network to seamlessly display the same contents on several screens. However, in order to support such N-screen play services, it is considered desirable to improve a structural and/or software portion of the terminal.

SUMMARY OF THE INVENTION

One aspect of the present invention is to provide a terminal for seamlessly displaying two or more contents on an external terminal and a contents sharing method thereof.

Another aspect of the present disclosure is to provide a terminal for controlling video or sound of the contents outputted to the external terminal and a contents sharing method thereof.

A terminal according to an embodiment of the present disclosure may include a display unit; a wireless communication unit configured to form a network with at least one external terminal; and a controller configured to set up at least two second display regions displayed on a first display region of the external terminal and control the wireless communication unit to transmit information corresponding to the second display regions to the external terminal.

Furthermore, the controller may control the first display region or second display regions of the external terminal to be displayed on a predetermined region of the display unit.

Furthermore, the second display regions may be created by dividing the first display region based on any one of a number of contents, an attribute of contents, and an input from the user for displaying on the external terminal.

Furthermore, the input from the user may be selected from any one of keys capable of selecting the number and arrangement of the second display regions displayed on the display unit.

Furthermore, information corresponding to the second display regions may include any one of a size, an arrangement, a displayed content, a play mode of the content, and an application corresponding to each of the second display regions.

Furthermore, the controller may control to check a size of the first display region of the external terminal received through the wireless communication unit, and determine the size and arrangement of each of the second display regions according to any one of a number of contents, an attribute of contents and an input from the user for displaying on the external terminal based on the checked size of the first display region.

Furthermore, the controller may control only one content according to its priority to be displayed in the overlapped region when some of the second display regions are overlapped with one another.

Furthermore, contents may be displayed on the second display regions, respectively, and the controller may control the display unit to display a list of contents being executed or contents executable on the second display region on which a touch input is generated when the touch input is generated on any one of the second display regions.

Furthermore, the controller may control a content that has been displayed on the first display region or a content that has been displayed on the display unit of the terminal to be seamlessly displayed on at least one of the second display regions.

Furthermore, the controller may generate notification information for notifying the occurrence of an event if the event occurs, and control the display unit to display at least one of the event and notification information.

Furthermore, the controller may control the wireless communication unit to transmit a control signal for displaying at least one of the event and notification information on any one of the second display regions to the external terminal.

Furthermore, the controller may control the wireless communication unit to receive an event occurred in the external terminal when the event is generated in the external terminal.

Furthermore, the controller may control any one of a size, an arrangement and a number of the set second display regions to be changed to reconfigure the second display regions when an event is generated.

Furthermore, the event may be any one of a change of the number of contents for displaying on the external terminal, a change of the attribute of contents, an input from the user, a message reception, a voice call reception, and a video call reception.

Furthermore, the controller may control the display unit to display an icon corresponding to an application being executed in the terminal or an application being executed according to an event generation on a region distinguished from the predetermined region.

Furthermore, the controller may control an application corresponding to the icon to be displayed on the external terminal when a touch input for dragging the icon to the first display region or the second display regions is generated.

Furthermore, a content transmitted by the terminal may be displayed or a content downloaded from a server according to the contents information transmitted by the terminal may be displayed on the second display region.

Furthermore, the terminal may further include a user input unit, and the controller may control the wireless communication unit to extract a play mode corresponding to sound or video outputted when reproducing contents for displaying on the first display region or the second display region based on information received through the user input unit, and transmit the extracted play mode to the external terminal.

Furthermore, the play mode may be any one of a sound elimination mode, a video elimination mode, a sound volume control method, and a video size control method.

Furthermore, the received information may be a gesture received through a touch sensor, a motion sensor or a camera, or a voice received through a microphone.

Furthermore, the controller may control the extracted play mode to be synchronized with the sound or video of the contents displayed on the external terminal.

A method of sharing contents in a terminal according to an embodiment of the present disclosure may include forming a network with at least one external terminal; setting up at least two second display regions displayed on a first display region of the external terminal; and transmitting information corresponding to the second display regions to the external terminal.

Furthermore, the method may further include displaying the first display region or second display regions of the external terminal on a predetermined region of the display unit of the terminal.

Furthermore, said setting step may include checking a size of the first display region of the external terminal received through the wireless communication unit, and determining the size and arrangement of each of the second display regions according to any one of a number of contents, an attribute of contents, and an input from the user for displaying on the external terminal based on the checked size of the first display region.

Furthermore, the method may further include generating notification information for notifying the occurrence of an event if the event occurs; and displaying at least one of the event and notification information.

Furthermore, the method may further include generating a control signal for displaying at least one of the event and notification information on any one of the second display regions; and transmitting the generated control signal to the external terminal.

Furthermore, an application corresponding to the icon may be displayed on the external terminal when a touch input for dragging the icon to the first display region or the second display regions is generated.

Furthermore, the method may further include receiving information through a user input unit; and extracting a play mode corresponding to sound or video outputted when reproducing contents for displaying on the first display region or the second display region based on the received information.

According to an embodiment of the present disclosure, two or more contents may be displayed at the same time through an external terminal connected to a terminal according to a control of the terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile communication terminal associated with the present invention will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the embodiments disclosed herein may be also applicable to stationary terminals such as a digital TV, a desktop computer, and the like, excluding cases only applicable to mobile terminals.

Figure 1:
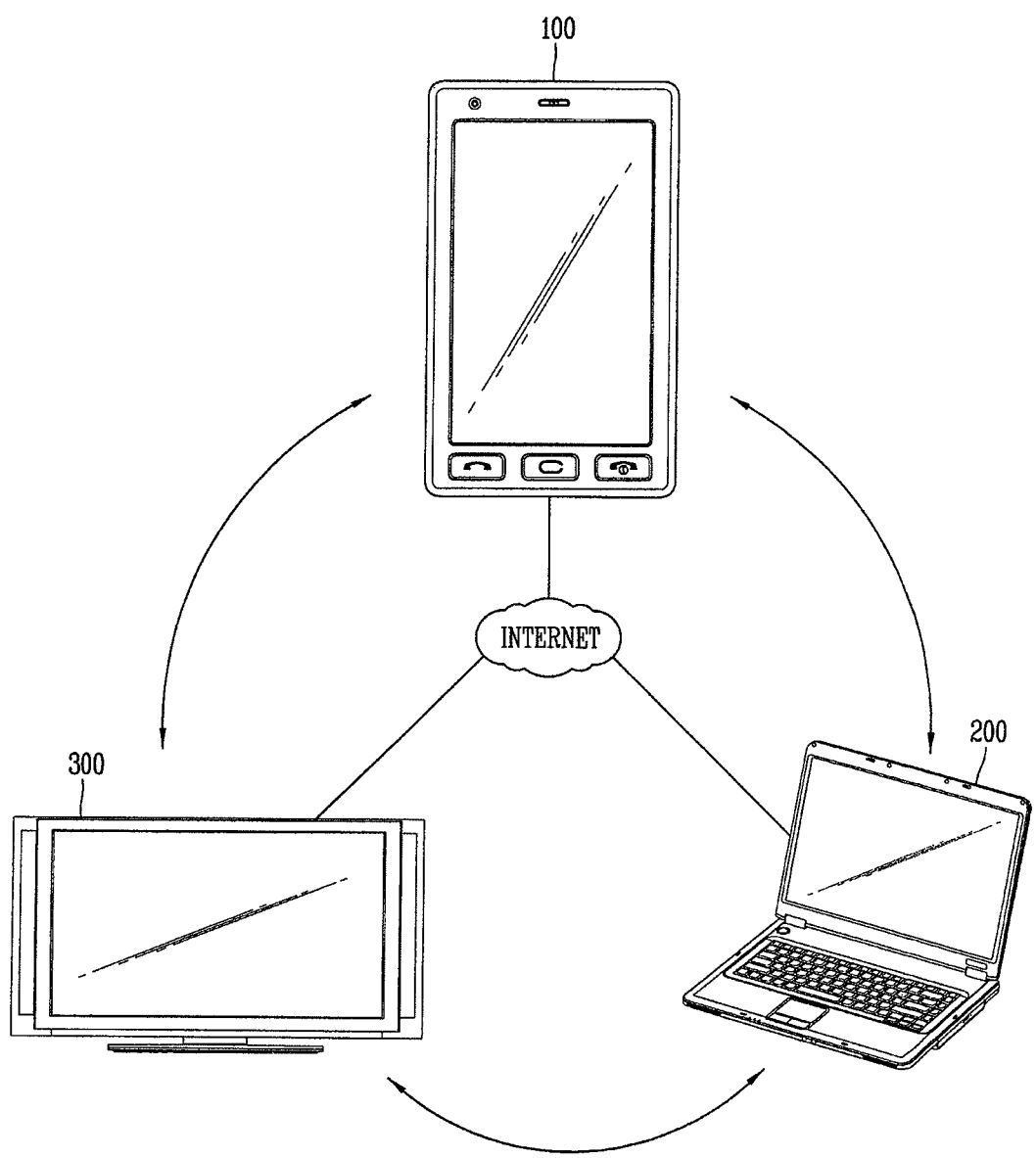
FIG. 1 is a structural view illustrating a service network associated with embodiment of the present invention.

FIG. 1 is a structural view illustrating a service network associated with embodiment of the present invention, in which an N-screen play service network is illustrated.

Referring to FIG. 1, a terminal 100 is connected to one or more external terminals 200, 300 in which a video display function is implemented, through a network. The terminal 100 transfers contents to the external terminals 200, 300 to allow the contents to be displayed on the external terminals 200, 300, or receives contents from the external terminals 200, 300 to display the contents on the screen, thereby allowing the contents to be shared with the external terminals 200, 300.

Furthermore, the terminal 100 controls to transfer contents from the external terminal 300 to the external terminal 200 to display the contents on the external terminal 200, thereby allowing the contents to be shared with the external terminal 200.

Here, the terminal 100 may use various communication methods such as WiFi, direct WiFi, Zigbee, UWB (Ultra-Wideband), Bluetooth, and the like. Furthermore, based on the communication method, the terminal 100 may be directly connected to the external terminals 200, 300 to transmit and receive data, or transmits and receives data through an access point.

Furthermore, the terminal 100 and the external terminals 200, 300 may share contents via the Internet network. The terminal 100 and the external terminals 200, 300 may receive and display contents connected to one another via the Internet to be synchronized with one another regardless of its place and equipment, thereby allowing the same contents to be shared with one another. As a result, the terminal 100 may control the external terminals 200, 300 in a direct manner or via the Internet to receive and display the contents synchronized with one another via the Internet, thereby allowing the contents to be with the external terminals 200, 300.

Here, the terminal 100 and the external terminals 200, 300 may use wireless Internet technologies, such as WLAN (Wireless LAN), Wi-Fi, Wibro (Wireless Broadband), Wimax (World Interoperability for Microwave Access), HSDPA (High Speed Downlink Packet Access), and the like.

Figure 2:
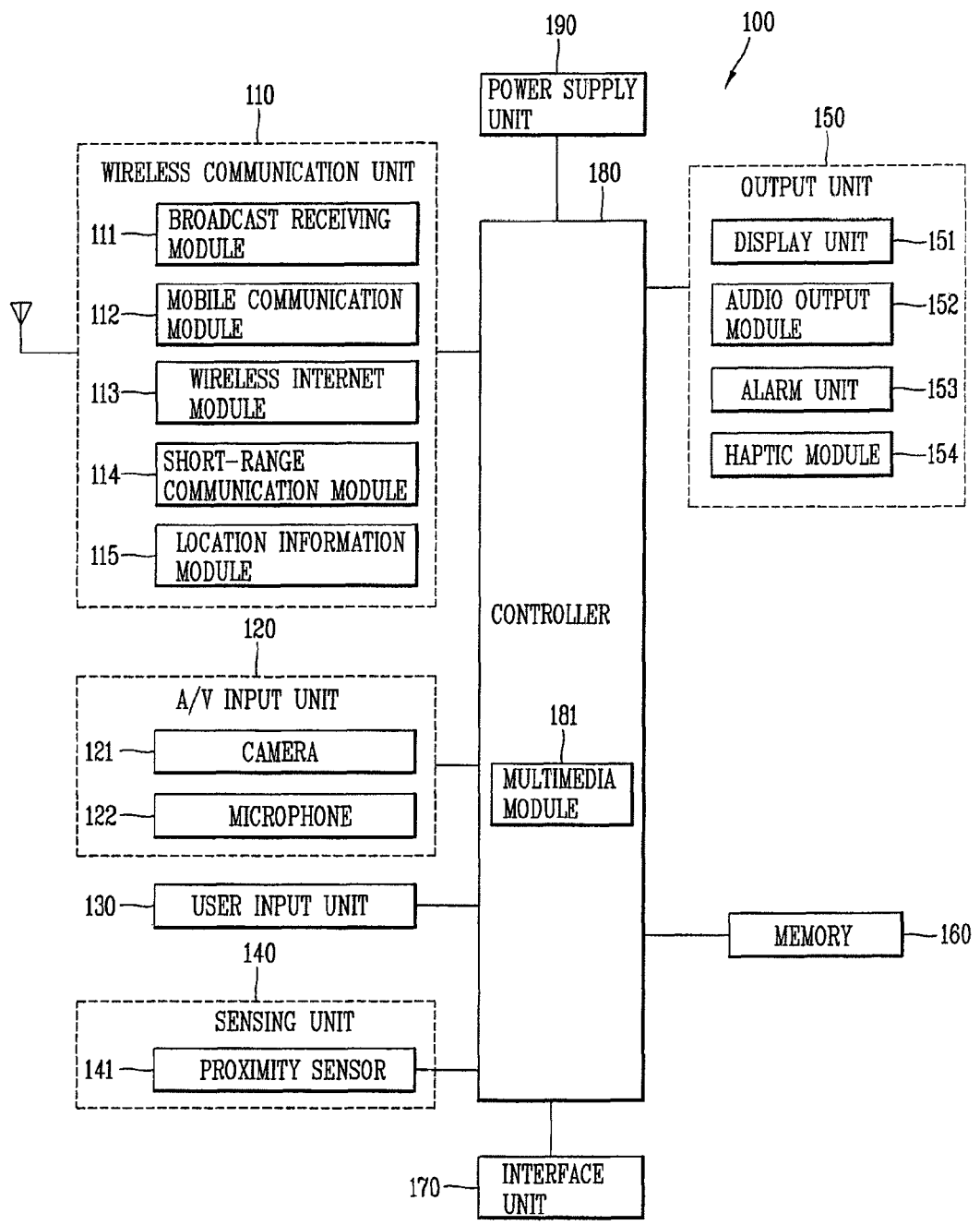
FIG. 2 is a block diagram illustrating a mobile terminal associated with an embodiment of the present invention.

FIG. 2 is a block diagram illustrating a mobile terminal associated with an embodiment of the present invention.

The mobile communication terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 2 are not necessarily required, and the mobile communication terminal may be implemented with greater or less number of elements than those illustrated elements.

Hereinafter, the constituent elements will be described in sequence.

The wireless communication unit 110 typically includes one or more elements allowing radio communication between the mobile communication terminal 100 and a wireless communication system, or allowing radio communication between radio communication the mobile communication terminal 100 and a network in which the mobile communication terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile communication terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile communication terminal, and there is a GPS module as a representative example.

Referring to FIG. 2, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile communication terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile communication terminal 100 such as an opened or closed state of the mobile communication terminal 100, a location of the mobile communication terminal 100, an orientation of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have an interlayer structure, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 2, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for processing the controller 180, and temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180.

Various embodiments described herein may be implemented in a computer-readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Figure 3A:
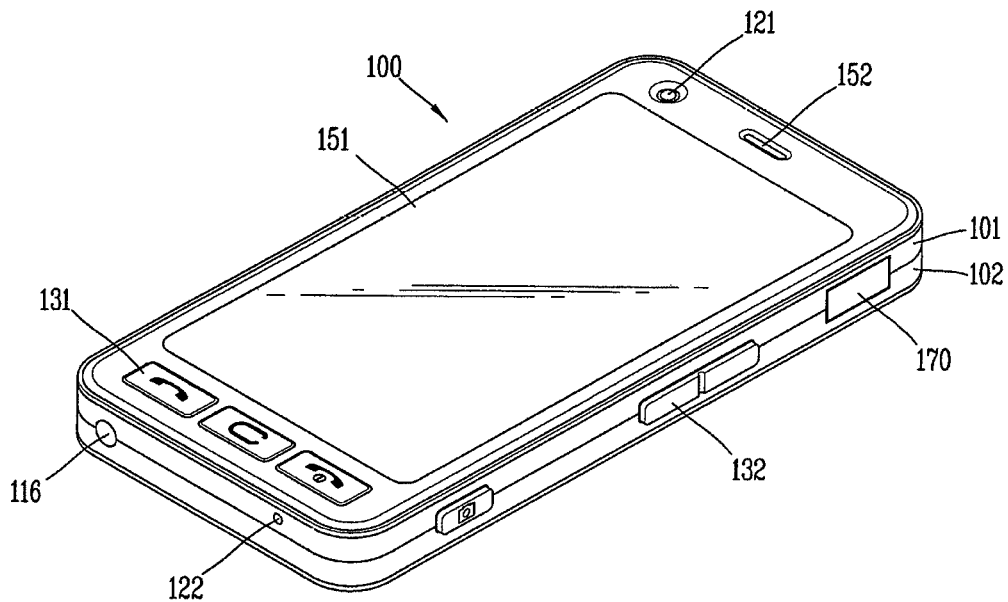
FIGS. 3A and 3B are perspective views illustrating a mobile terminal or portable terminal associated with the present invention.

FIG. 3a is a front perspective view illustrating an example of a mobile terminal or portable terminal associated with the present invention.

The portable terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (e.g., 131, 132), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the first and second manipulation units 131, 132 may be set in various ways. For example, the first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display unit 151.

Figure 3B:
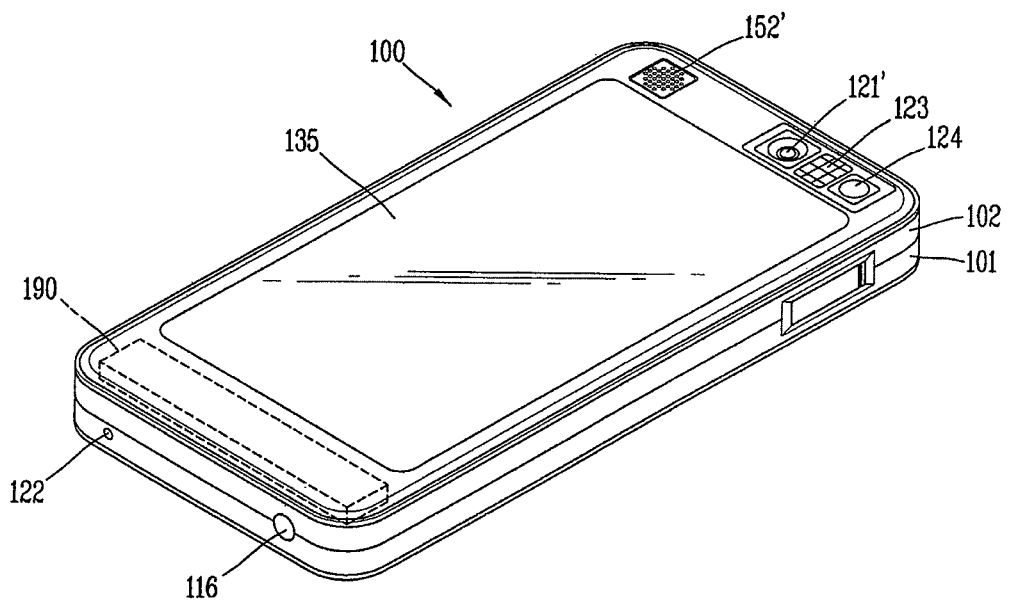

FIG. 3B is a rear perspective view illustrating a portable terminal illustrated in FIG. 3A.

Referring to FIG. 3B, a camera 121' may be additionally mounted on a rear surface of the terminal body, namely, the rear case 102. The camera 121' has an image capturing direction, which is substantially opposite to the direction of the camera 121 (refer to FIG. 3A), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately. The cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) via the camera 121'.

Furthermore, an audio output unit 152' may be additionally disposed on a rear surface of the terminal body. The audio output unit 152' together with the audio output unit 152 (refer to FIG. 3A) can implement a stereo function, and it may be also used to implement a speaker phone mode during a phone call.

Furthermore, an antenna for receiving broadcast signals may be additionally disposed on a lateral surface of the terminal body. The antenna 124 constituting a broadcast receiving module 111 (refer to FIG. 2) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151. In this case, if the display unit 151 is configured to display visual information on both surfaces thereof, then the visual information may be also recognized through the touch pad 135. All the information displayed on the both surfaces may be controlled by the touch pad 135. Alternatively, a display may be additionally mounted on the touch pad 135, and thus a touch screen may be also disposed on the rear case 102.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

On the other hand, in FIG. 1, it is illustrated a case where the terminal 100 is a portable phone, and the external terminals 200, 300 are a television and a laptop computer as an example, but this does not limit the present invention. According to the present invention, the terminal 100 may be also implemented by a smart phone, a laptop computer, a digital broadcast terminal, a personal digital assistant (PDA), a portable multimedia player (PMP), a navigation, a television, a desktop computer, a set-top box, and the like. In addition, the external terminals 200, 300 may be also implemented by a portable phone, a smart phone, a digital broadcast terminal, a PDA, a PMP, a navigation, a desktop computer, a set-top box, and the like.

On the other hand, the structure of the external terminals 200, 300 as illustrated in the above FIG. 1 is similar to the structure of the terminal 100 illustrated with reference to FIG. 2, and the description of the external terminals 200, 300 will be omitted.

The embodiments disclosed herein may be implemented in the terminal 100 as illustrated with reference to FIGS. 1 through 3B.

Hereinafter, a method of displaying a plurality of contents on an external terminal and the operation of a terminal for implementing the same according to a first embodiment of the present disclosure will be described in detail with reference to FIGS. 4 through 9.

Figure 4:
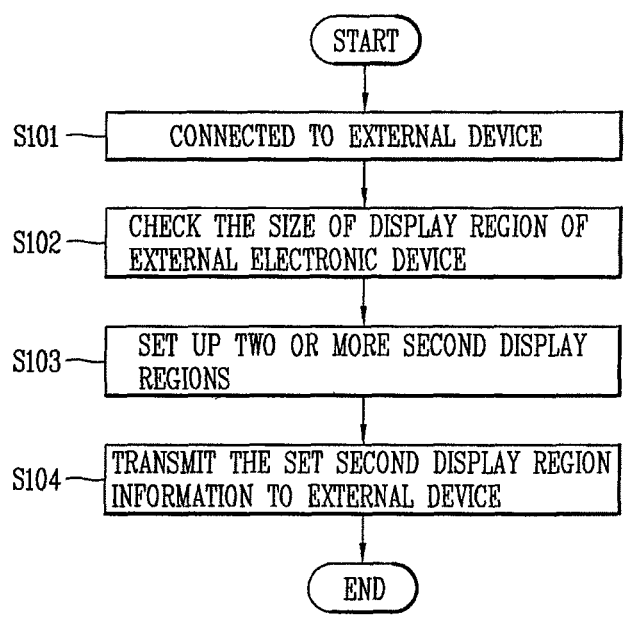
FIG. 4 is a flow chart illustrating a contents sharing method of a terminal according to a first embodiment of the present invention.

FIG. 4 is a flow chart illustrating a contents sharing method of a terminal according to a first embodiment of the present invention. Furthermore, FIGS. 5A through 9 are views for explaining a contents sharing method according to a first embodiment of the present disclosure.

Referring to FIG. 4, the controller 180 is connected to a first external terminal 200-1 through the communication unit 110 (S101).

Then, the controller 180 checks the size (for example, number of horizontal/vertical pixels, resolution, etc.) of a display region 210 (hereinafter, referred to as a "first display region") of the first external terminal (S102). The first display region 210 is a region capable of displaying two or more contents at the same time, which denotes an overall or partial display region of the first external terminal. The terminal stores the checked size of the first display region 210 in the memory, and if it is connected to the same first external terminal thereafter, then the controller 180 may retrieve the size of the first display region 210 stored in the memory without checking the size of the first display region 210 again.

Then, the controller 180 sets up at least two display regions (hereinafter, second display regions) in which different contents are to be displayed at the same time, on the first display region 210 (S103). Specifically, the controller 180 determines the number of second display regions to be displayed at the same time on the first display region according to the number and attribute of contents to be displayed on an external terminal or the user's selection, based on the checked size of the first display region.

On the other hand, the controller 180 may determine a number of second display regions, a size ratio and an arrangement between the second display regions according to the number and attribute of contents to be displayed on an external terminal or the user's selection. For example, if the controller 180 determines only the number of second display regions and transmits it to the external terminal 200, then the external terminal may divide the first display region according to the received number to display the second display regions.

On the other hand, in the step S103, the controller 180 may set up various types and numbers of second display regions on the first display region 210. FIGS. 5A through 5D are views illustrating second display regions configured by the controller 180.

Figure 5A:
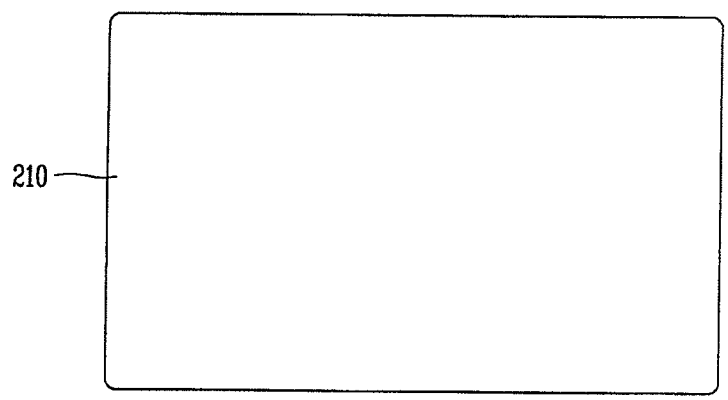
FIGS. 5A through 5D are views illustrating a first display region and a second display region according to a first embodiment of the present invention.
Figure 5B:
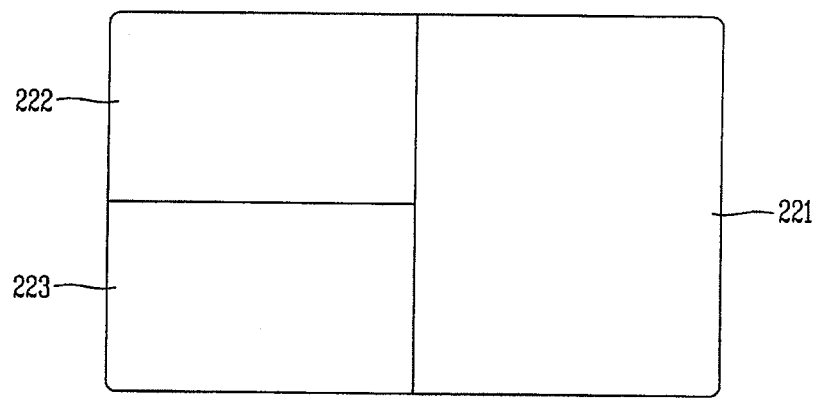

Referring to FIGS. 5A and 5B, for example, the controller 180 may configure second display regions 221, 222, 223 by dividing the first display region 210 in a horizontal direction (and/or vertical direction) according to the number of displayed contents. The size of each second display region may be configured to be identical or may be configured to be different according to the attribute of the contents (for example, video, sound, web page, message, call, etc.) Furthermore, the controller 180 may configure or change the size of each second display region according to the user's selection.

Figure 5C:
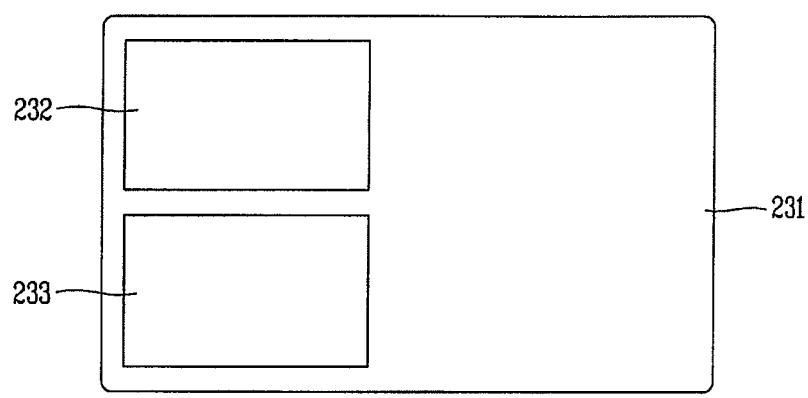
Figure 5D:
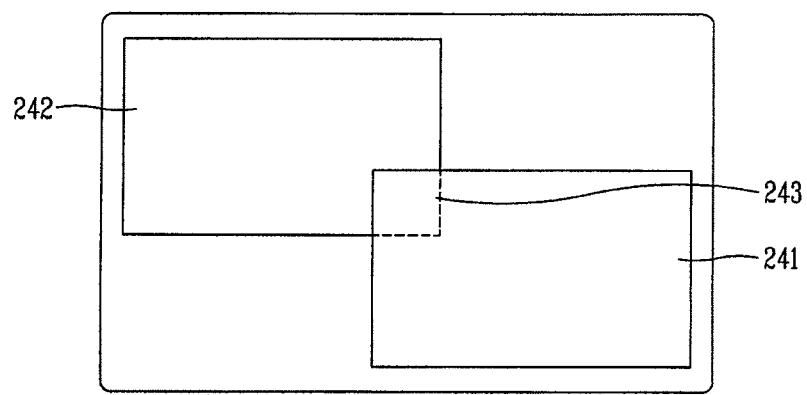

Referring to FIGS. 5C and 5D, for example, the controller 180 may configure some of the second display regions 231, 232, 233 to be overlapped with one another. Referring to FIG. 5C, one second display region 232, 233 may be included in the other second display region 231. Referring to FIG. 5D, a partial portion 243 of the second display regions 241, 242 may be configured to be overlapped with each other. The overlapped region 243 in FIGS. 5C and 5D is displayed with one content according to the priority of the contents based on the user's selection or the attribute of the contents.

Referring to FIG. 4 again, the controller 180 controls to transmit information on second display regions configured in the step S103 through the communication unit 110 to the external terminal 200, and display particular contents on the second display regions of the external terminal 200, respectively (S104). The information on the second display regions may include a size and an arrangement of each second display region, and information on contents to be displayed.

Any one of the contents to be displayed on the second display regions, respectively, may be a content that has been displayed on the first display region 210. Furthermore, the contents displayed on the second display region, respectively, may be contents transferred through the Internet network or contents stored in the memory of the external terminals 200, 300. Furthermore, on the second display region, the content that has been displayed on the terminal 100 may be transferred (from the terminal 100 or the Internet network) to be displayed seamlessly.

Then, the controller 180 may reconfigure the second display regions that have been set up in the step S103 (S105). If the number of contents to be displayed at the same time on the external terminal 200 is increased or decreased, then the controller 180 reconfigures the configured second display regions according to a changed number of contents. Alternatively, even in case where the number of contents is not changed, it may be reconfigured to change the attribute of contents being displayed on the external terminal or change the size and/or arrangement of the configured second display regions according to the user's selection.

Then, as described in the step S104, the controller 180 transmits information on the second display regions that has been reconfigured in the step S105 through the communication unit 110, and controls to additionally display contents on the external terminal, not to display the contents being displayed, or change the contents being displayed (S106).

Figure 6:
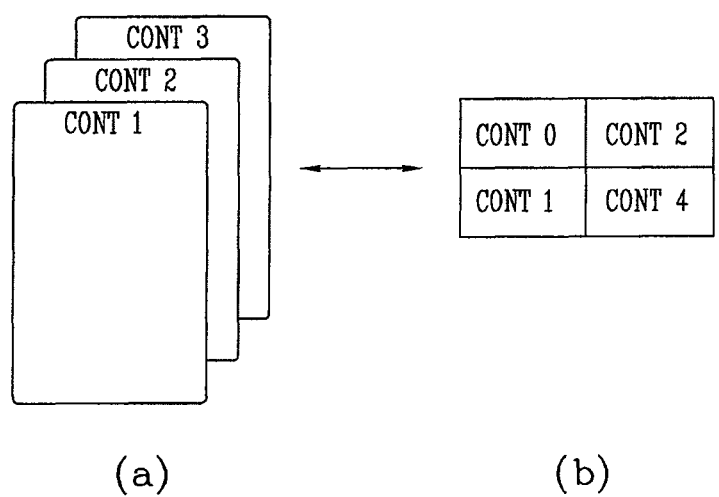
FIG. 6 is a conceptual view for explaining a contents sharing method of a terminal associated with the multi-tasking of the terminal according to a first embodiment of the present invention.

FIG. 6 is a conceptual view for explaining a contents sharing method of a terminal associated with the multi-tasking of the terminal according to a first embodiment of the present invention.

FIG. 6A is a view conceptually illustrating applications (tasks or contents) being executed at the same time in the terminal. FIG. 6B is an embodiment of second display regions displayed on the first display region 210 of the external terminal 200. For example, the controller 180 drives an application according to the user's input to display content 3 on the display unit. Then, the controller 180 drives another application according to the user's input using a multitasking key 402, or the like, or according to the generation of an event to display content 2 on the display unit. In this manner, as contents 1, 2, and 3 are displayed sequentially (or concurrently), the contents 1, 2, and 3 are displayed at the same time on the second display regions of the external terminal, respectively, as illustrated with reference to FIG. 4.

Furthermore, according to the user's input, the controller 180 may control only the contents (for example, contents 1 and 2) related to a particular application selected by the user among the applications being executed in the terminal to be displayed on the external terminal 200.

Furthermore, the controller 180 may control contents (for example, content 0) related to an application being executed in the external terminal 200 or contents (for example, content 4) related to an application being executed in the external terminal 300 to be to displayed or not displayed at the same time on the second display regions of the external terminal, respectively.

Figure 7A:
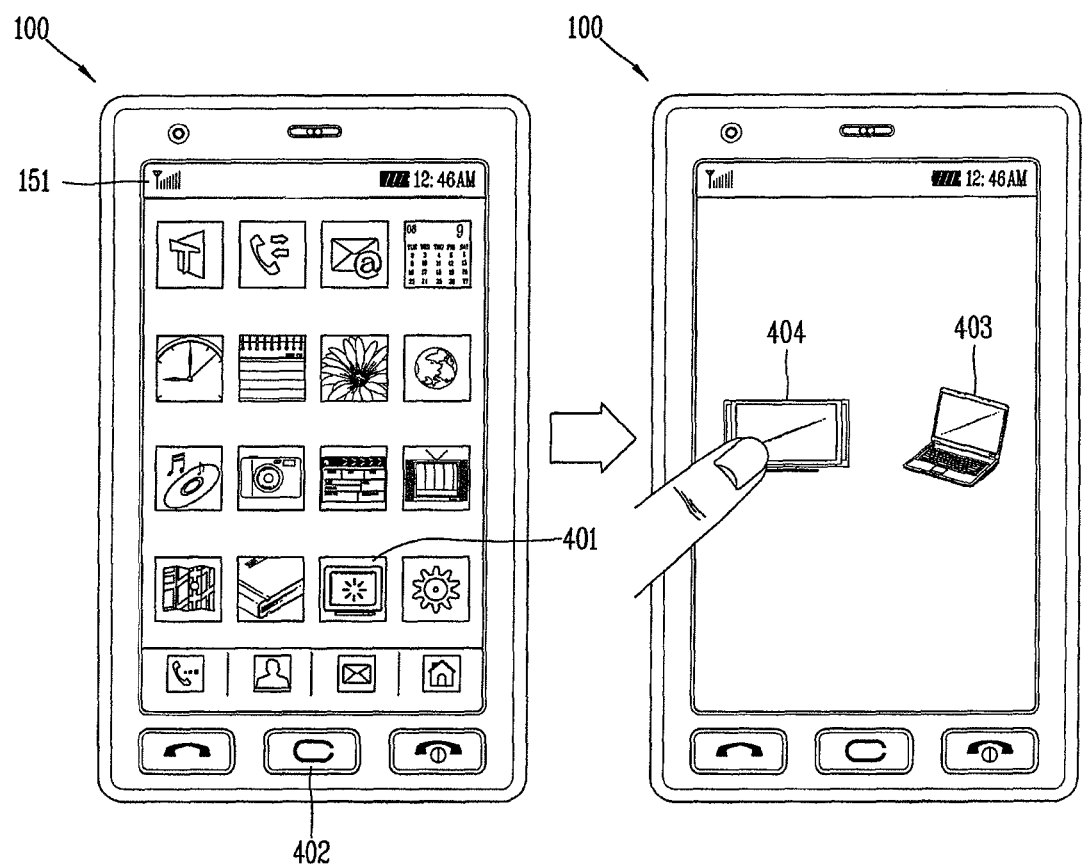
FIGS. 7A through 7C are views illustrating a method of allowing a terminal to control the display region of an external terminal in the aspect of a user interface according to a first embodiment of the present invention.
Figure 7B:
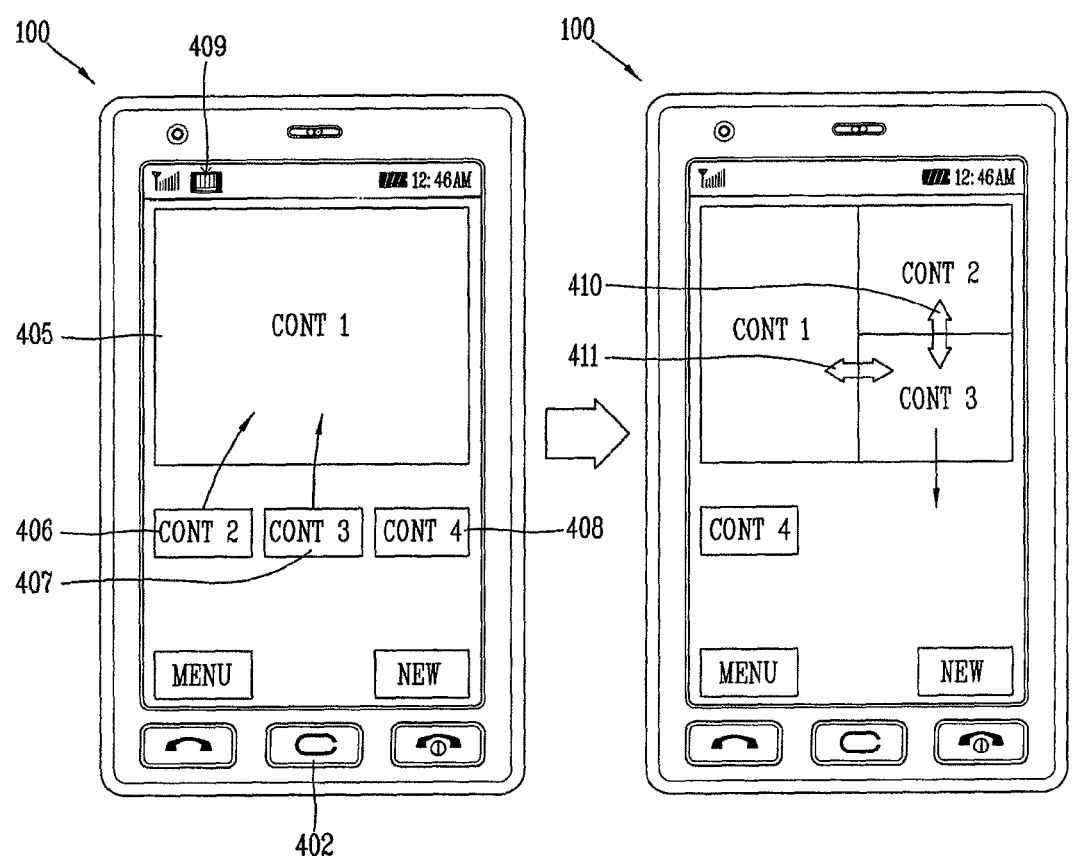
Figure 7C:
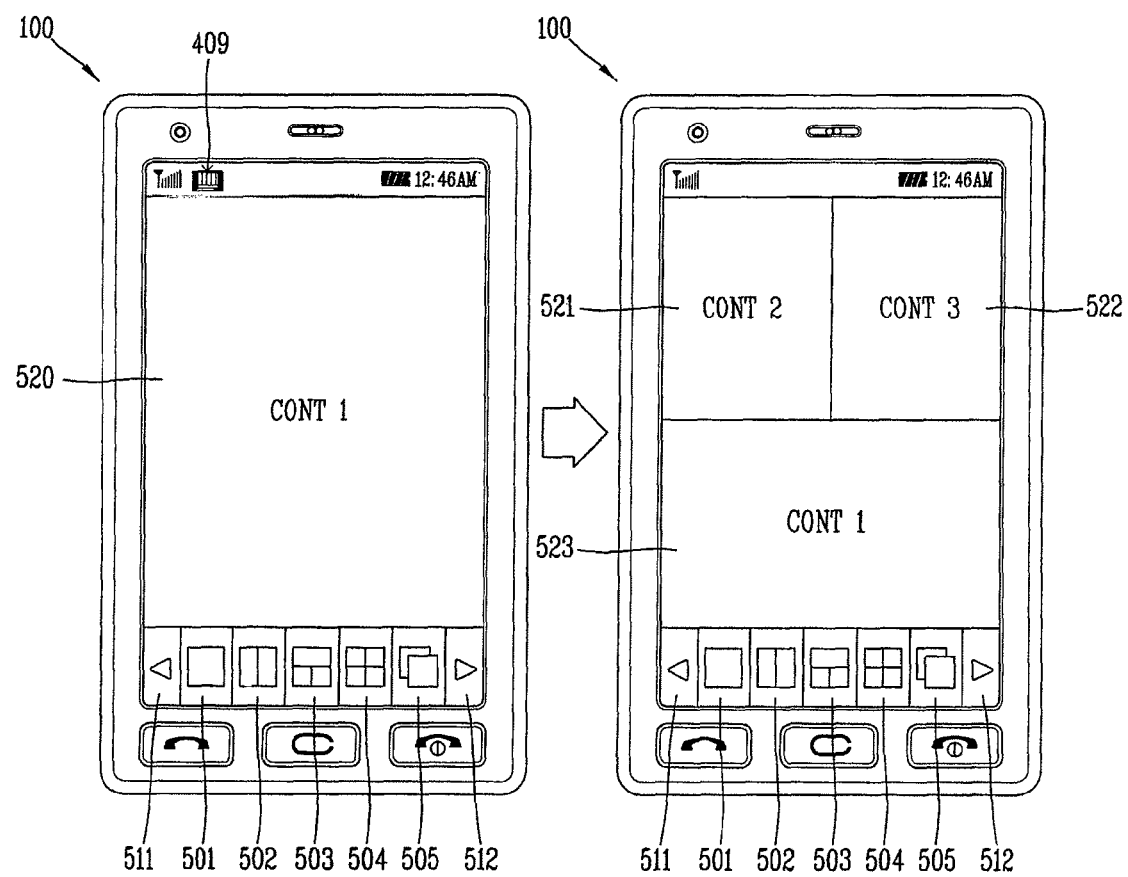

FIGS. 7A through 7C are views illustrating a method of allowing a terminal to control the display region of an external terminal in the aspect of a user interface.

Referring to FIGS. 7A and 7B, according to driving of an N-screen related application 401 (hereinafter, N-screen application), the controller 180 searches and displays external terminals 200, 300 capable of sharing contents (see 403, 404), and allows one or more devices selected by the user among the searched external terminals 200, 300 to be connected thereto. Otherwise, the controller 180 stores information of external terminals that have been previously connected thereto as a list and allows one or more external terminals selected by the user from the list to be connected thereto. When connected to an external terminal, then the controller 180 may display an icon (409 in FIG. 7B) of the external terminal on a region (for example, indicator region) of the display unit.

FIG. 7B is a view illustrating an example of a user interface for allowing a terminal to control a display region of the external terminal.

Referring to FIG. 7B, the controller 180 displays a region 405 indicating a first display region 210 of the external terminal. If two or more second display regions are configured by the foregoing method (S101-S105), then the second display regions configured in the region 405 will be displayed.

In the region 405 indicating the first display region, a content (cont1) currently being displayed on the first display region 210 may be displayed. As illustrated in FIG. 7B, if the external terminal displays contents on two or more second display regions, respectively, then the controller 180 may display second display regions configured in the region 405 indicating a first display region and contents (cont1, cont2, cont3) displayed on the regions, respectively.

In displaying contents displayed on the first or the second display region in the region 405, the name of an application being executed, the name of a content being displayed, the still image of an image displayed on each display region, and the like may be displayed on the corresponding region. Furthermore, the controller may display contents displayed on the first or the second display region in the region 405 to be synchronized therewith. For example, if the content displayed on the external terminal 200 is a content stored in the external terminal 200 or the external terminal 300, then the controller may receive and display it from the external terminal. If the contents displayed on the external terminal 200 is a content reproduced and transmitted by the terminal 100, then the controller may directly display it on the relevant region of the region 405.

Furthermore, the controller 180 may control a size of the second display region according to the user's input 410, 411 for dragging a boundary of the second display region.

Furthermore, as illustrated in FIG. 7B, the controller 180 may display a region displaying the icons 406, 407, 408 of applications (or contents) being executed at the same time on the display unit 151. The applications being executed at the same time may include an application selected by the user using a multitasking key and an application executed according to event occurrence. Furthermore, the terminal 100, of course, may include an application being executed in an external terminal 200 or another external terminal 300 connected thereto. Furthermore, for example, when a predetermined key ("NEW") is entered by the user, the controller outputs a list of applications or contents, and if one or more items thereof are selected, then the controller may implement the selected applications or contents, thereby controlling them to be additionally displayed on the second display regions and the region 405.

In FIG. 7B, if a touch input for dragging icons 406, 407 into the region 405 indicating a first display region is detected, then the controller 180 controls a content corresponding to the selected icon to be additionally displayed at the same time on the external terminal (S101-S105), and displays the region 405 indicating a first display region similarly to the first display region 210 of the external terminal. On the contrary, if a user input for dragging a second display region displayed on the region 405 indicating a first display region into a predetermined region (for example, a region displaying icons 406, 407, 408) is detected, then the controller 180 controls such that a content being displayed on the selected second display region is no more displayed.

FIG. 7C is a view illustrating an example of a user interface for controlling a display region of the external terminal.

The controller displays keys 501-512 for allowing the user to select the number or arrangement of second display regions through the display unit 151. On the other hand, the keys 501-512 may be displayed together with user interfaces 405-410 as illustrated in FIG. 7B or displayed to be used prior to or subsequent to displaying them.

Referring to FIG. 7C, the controller displays keys 501-505 capable of selecting the number and arrangement of second display regions through the display unit 151. For example, the controller controls to display one content on the first display region 210 when entering a key 501, and divides the first display region 210 into three to configure three second display regions when entering a key 503. Furthermore, the controller may display the configured three second display regions through the display unit 151 (see 521, 522, 523). Next, according to the method described with reference to FIG. 7B, contents to be displayed on each configured second display region may be selected. Otherwise, if any one of the second display regions 521, 522, 523 displayed on the display unit 151 is touched, then the controller may display a list of applications (or contents) being executed or to be executed, and execute an application (or content) selected from the list to display it on the corresponding second display region.

Figure 8:
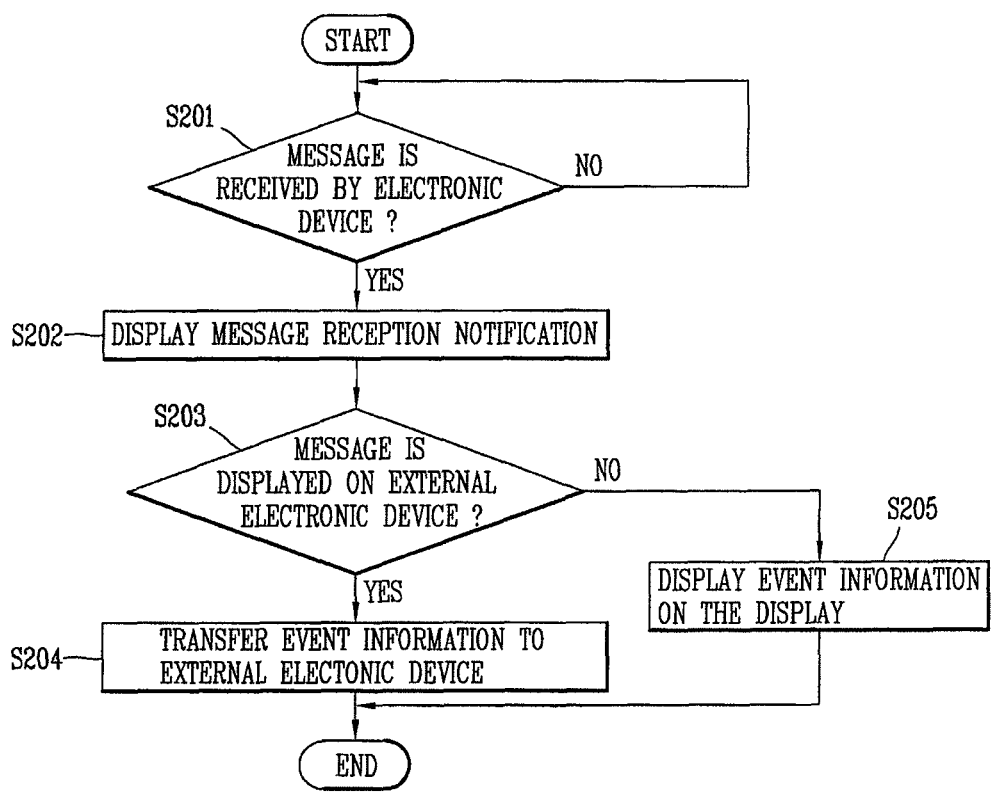
FIG. 8 is a flow chart illustrating a method of controlling information associated with the generated event to be displayed on an external terminal when an event is generated in a terminal according to a first embodiment of the present invention.

FIG. 8 is a flow chart illustrating a method of controlling information associated with the generated event to be displayed on an external terminal when an event is generated in a terminal.

As described above, if an event (message reception, call signal reception, etc.) occurs in a state that the terminal 100 is connected to the external terminal 200 (or in a state that the terminal 100 shares a content with the external terminal 200) (S201), then the controller 180 displays through the display unit 151 that an event has occurred (and the display unit of the external terminal 200) (S202). At the same time, the controller 180 displays a window capable of selecting whether to display an event that has been occurred on the external terminal 200 and waits for a user input (S203). If the user selects to display a message on the external terminal 200, then the controller 180 configures or reconfigures a second display region according to the foregoing method to additionally display event information on the external terminal 200 at the same time, and transfers it to the external terminal 200 together with the event information (S204). If the user selects not to display a message on the external terminal 200, then the controller 180 may display event information through the display unit 151 (S205).

Figure 9:
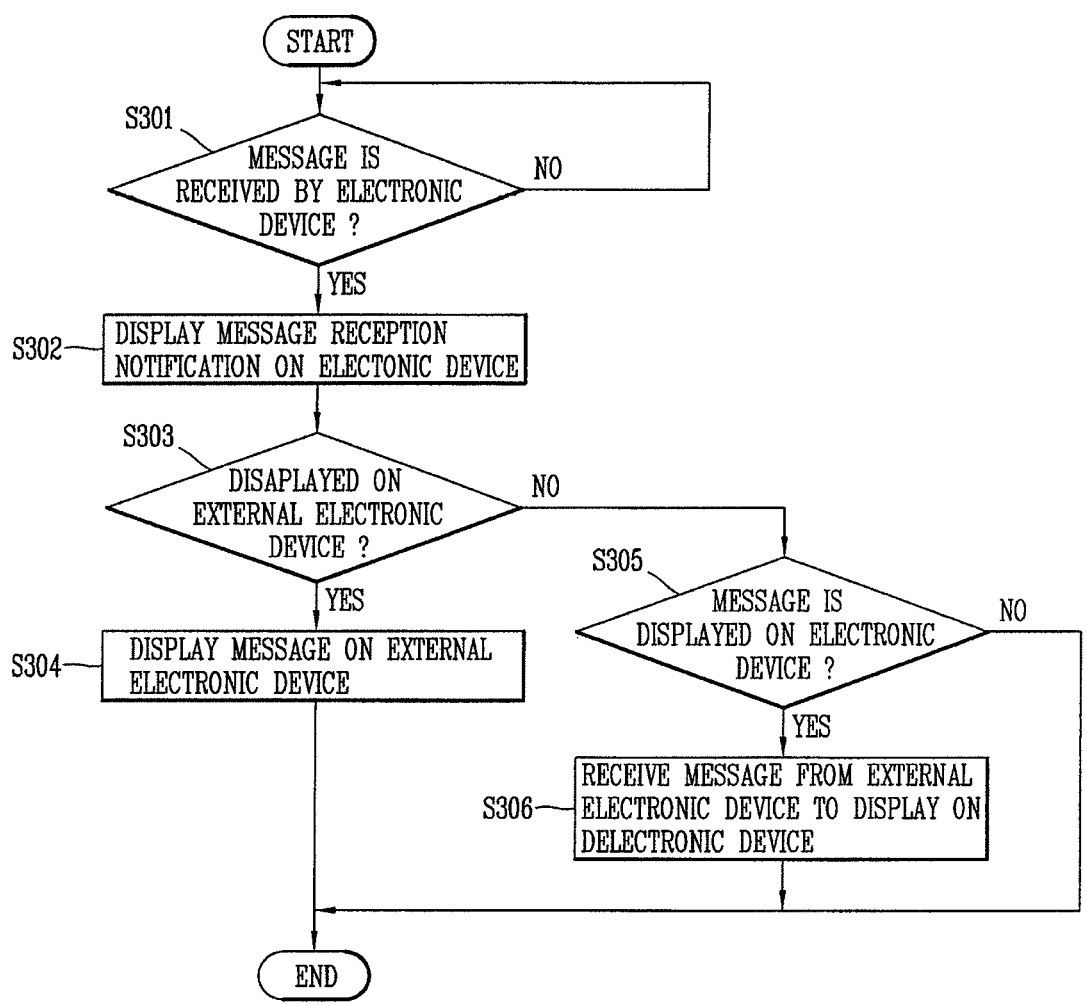
FIG. 9 is a flow chart illustrating a method of controlling information associated with the generated event to be displayed on an external terminal when an event is generated in the external terminal according to a first embodiment of the present invention.

FIG. 9 is a flow chart illustrating a method of controlling information associated with the generated event to be displayed on an external terminal when an event is generated in the external terminal.

As described above, if an event occurs in a state that the terminal 100 is connected to the external terminal 200 (or in a state that the terminal 100 shares a content with the external terminal 200) (S301), then the external terminal 200 transfers the event occurrence to the terminal 100. The controller 180 that has received the event occurrence displays that an event has occurred through the display unit 151 (and the display unit of the external terminal 200) (S302). At the same time, the controller 180 displays a window capable of selecting whether to display an event that has been occurred on the external terminal 200 and waits for a user input (S303). If the user selects to display a message on the external terminal 200, then the controller 180 configures or reconfigures a second display region according to the foregoing method to additionally display event information on the external terminal 200 at the same time, and transfers the configured second display region information and control signals (S304). If the user selects not to display a message on the terminal 100 (S305), then the controller 180 may receive event-related information from the external terminal 200 to display on the display unit (S306).

FIGS. 10 through 16 are views for explaining a method of controlling sound or video of the contents shared by a terminal together with an external terminal according to a second embodiment of the present invention.

Figure 10:
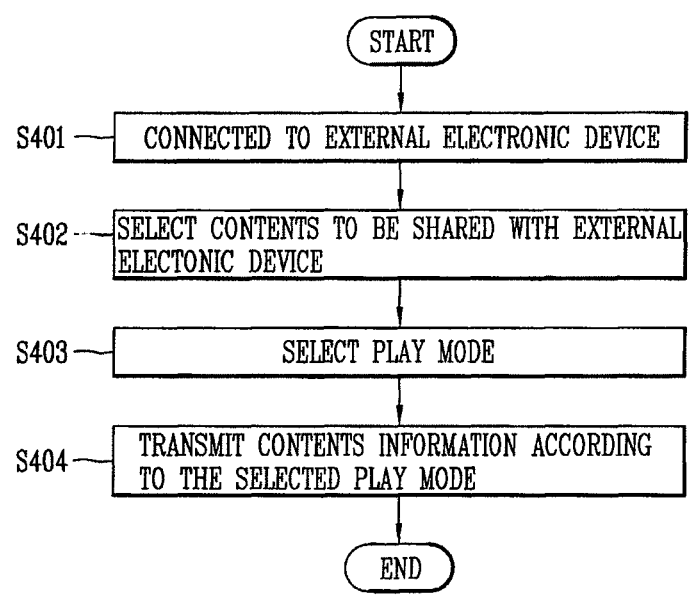
FIG. 10 is a flow chart illustrating a method of controlling sound or video of the contents shared by a terminal together with an external terminal according to a second embodiment of the present invention.

FIG. 10 is a flow chart illustrating a method of controlling sound or video of the contents shared by a terminal together with an external terminal according to a second embodiment of the present invention.

In the above, according to the foregoing method, the controller 180 is connected to the external terminal 200 through a communication unit (S401).

According to the user's input, the controller 180 selects a content to be transferred to the external terminal 200 (S402). If a predetermined user's input to be described later is entered, then the content being displayed may be selected.

Next, the controller 180 selects a play mode related to sound or video outputted when reproducing the selected content in the external terminal 200 (S403). Here, the play mode denotes a condition or restriction for which the content transferred from the terminal 100 to the external terminal 200 is associated with the sound or video to be outputted in the external terminal 200. The play mode may include a sound elimination mode in which only video is outputted but sound is not outputted, a sound volume control method (for example, maximum volume transfer method) in which a sound volume being outputted together with video is controlled, a video elimination mode in which only sound is outputted but video is not outputted, a video size control method (for example, a method of controlling a size of video according to the size of an overall display region of the external terminal 200) in which the size of video being outputted is controlled.

Next, the controller 180 transmits contents information according to the selected contents play mode to the external terminal 200 through a communication unit to allow the content to be reproduced in the external terminal 200 according to the selected play mode (S404).

Here, contents information according to the contents play mode may denote changed contents according to the selected play mode. In other words, the controller 180 may change contents by eliminating sound data (or extracting only video data) of the selected contents, amplifying sound data of the contents with a predetermined ratio, or eliminating video data (or extracting only sound data) from the content data, according to the selected play mode. Furthermore, the controller 180 may check the size of a display region of the external terminal 200, and change contents by enlarging or reducing a video size of the contents according to the checked size of the display region.

Furthermore, contents information according to the contents play mode may include unchanged contents and control signals for controlling the contents to be outputted according to the play mode selected by the external terminal 200.

Furthermore, if the controller 180 controls only either one of video and sound of the contents to be outputted, then the controller 180 continues to output video or sound not being outputted from the external terminal 200 through the terminal 100. At this time, the controller 180 may control contents outputted from the external terminal 200 and terminal 100 to be synchronized with each other.

Furthermore, while reproducing contents according to a play mode selected by the external terminal 200, the controller 180 may change the play mode by selecting a different play mode and transmitting contents information according to the changed play mode, according the method described in the steps S403 and S404.

FIGS. 11A through 16 are views for explaining a method of selecting shared contents and a play mode thereof based on the user's input according to a second embodiment of the present invention.

If a predetermined user's input (for example, a touch input or long touch input for dragging a display region displayed with the video of contents in a predetermined direction, an input by menu selection, or the like) is detected while reproducing contents to be transferred to the external terminal 200, then the controller 180 transfers contents being reproduced (or contents selected from a list) to the external terminal 200. At this time, it may be possible to select a play mode for which contents are to be reproduced in the external terminal 200, according to the user's input related to play modes which will be described below, together with the user's input (or without the user's input) for transferring the selected contents.

Figure 11A:
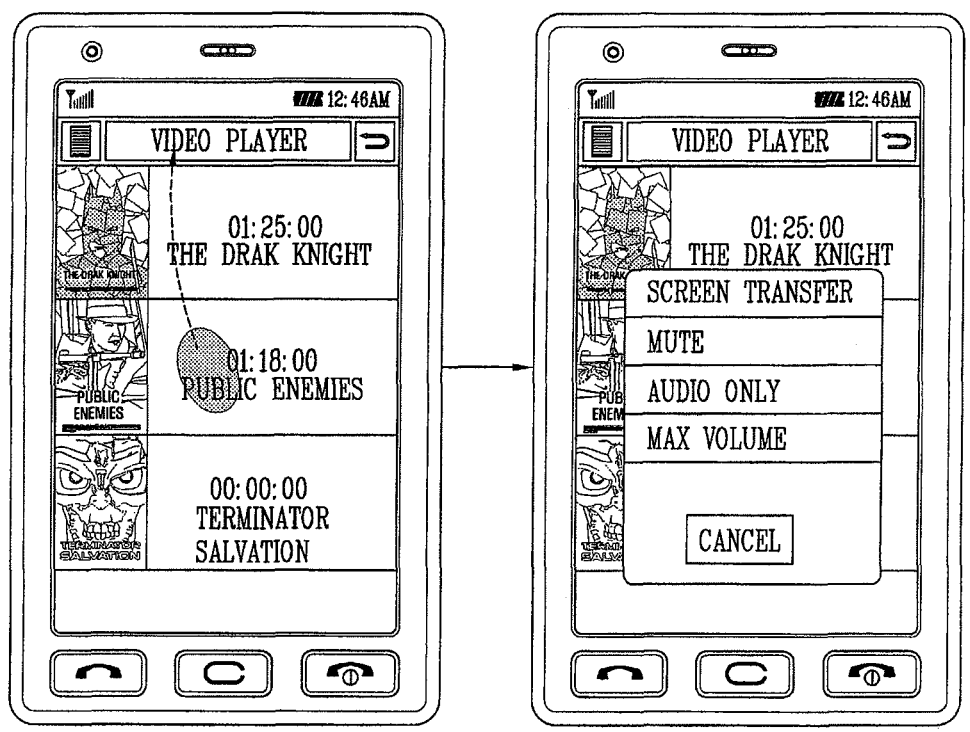
FIGS. 11A through 16 are views for explaining a method of selecting shared contents and a play mode thereof based on the user's input according to a second embodiment of the present invention.
Figure 11B:
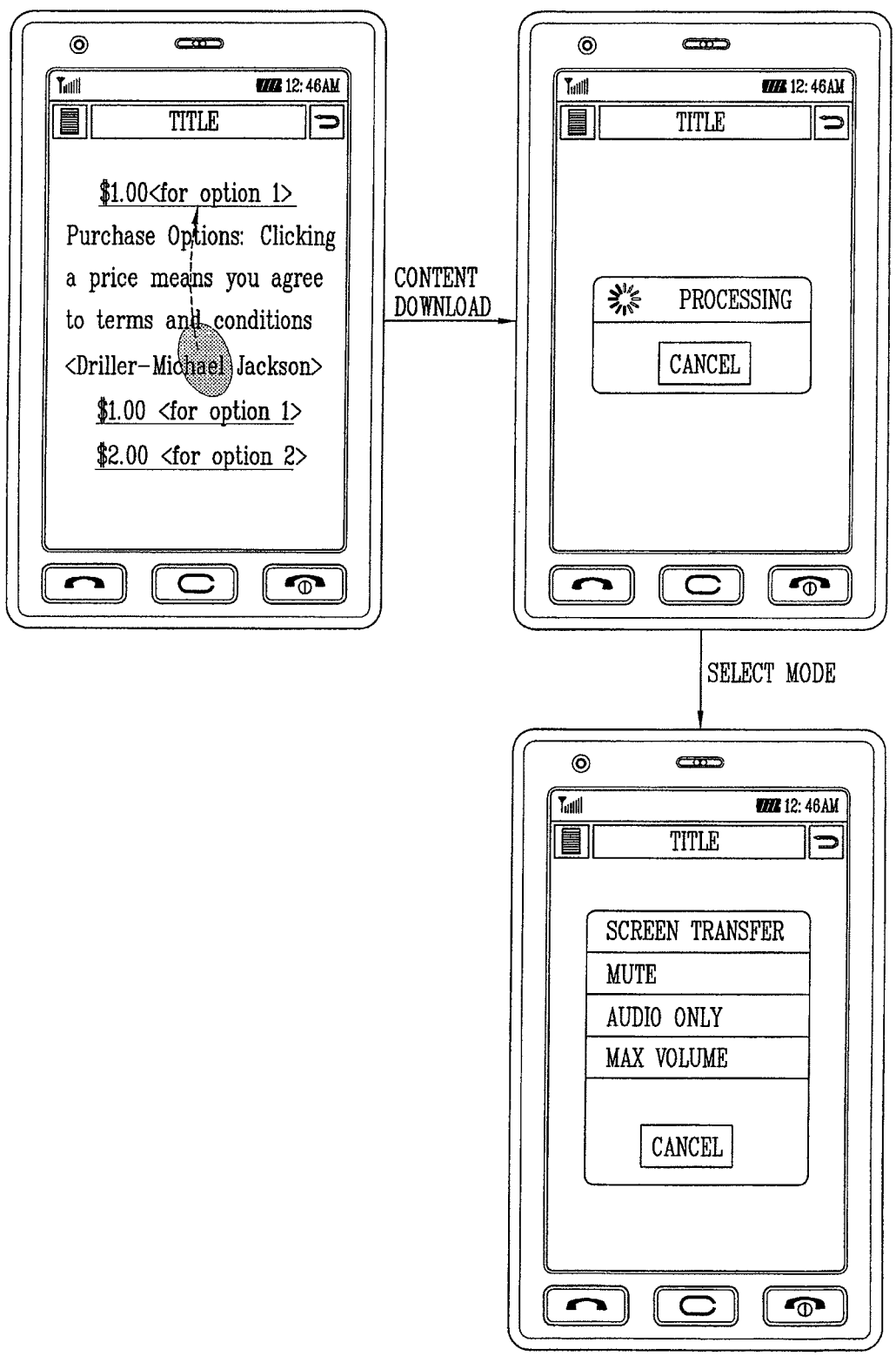

FIGS. 11A through 11B are views illustrating a method of selecting contents and a play mode thereof using a context menu.

Referring to FIG. 11A, as described above, the controller 180 is connected to the external terminal 200 through a communication unit to drive an application for reproducing contents and display a contents list on the display unit 151. If a content to be transferred to the external terminal 200 is selected from the contents list (if a predetermined menu is selected in a state that sound or video is outputted through the display unit 151 and/or audio output module 152 by reproducing the selected contents), then the controller 180 displays a menu capable of selecting a play mode, and waits for the user's touch input. If any one play mode is selected from the user, then contents information according to a play mode selected by the foregoing method is transmitted to the external terminal 200.

Referring to FIG. 11B, if a specific linked content is selected by driving a web browser in the terminal 100 while displaying the web page, then the controller 180 receives the linked content to transfer to the external terminal 200 according to a predetermined user's input. At this time, the controller 180 displays a menu capable of selecting a play mode through the display unit 151, and waits for the user's touch input. If any one play mode is selected from the user, then contents information according to a play mode selected by the foregoing method is transmitted to the external terminal 200.

Figure 12A:
Figure 12B:

FIGS. 12A and 12B are views illustrating a method of selecting a play mode of contents using a camera or microphone.

As illustrated in FIG. 12A, the controller 180 can select a play mode according to the information received through a camera 121. For example, if the user touches contents video to drag it to the camera 121, then the controller 180 selects a sound elimination mode. For this purpose, the controller 180 drives the camera 121, and analyzes video received through the camera 121 to determine whether the camera is hidden. For example, it may be determined whether the camera is hidden by analyzing the video received through the camera 121. For example, it may be determined whether the camera is hidden by analyzing the movement, direction, location, and the like, of his or her finger in the received video. Otherwise, it may be determined whether the camera is hidden by measuring the amount of light entered to the camera.

On the other hand, as illustrated in FIG. 12B, the controller 180 may select a play mode according to the information received through a microphone 122. For example, if the user touches contents video to drag it to the microphone 122, then the controller 180 selects a video elimination mode. For this purpose, the controller 180 analyzes sound received through the microphone 122 to determine whether the microphone is hidden.

Figure 13A:
Figure 13B:

FIGS. 13A and 13B are views illustrating a method of selecting a play mode of contents using a touch sensor.

The controller 180 analyzes the user's gesture received through the touch sensor, and selects a play mode according to the type of gesture. For example, the controller 180 selects a video elimination mode when a gesture diverted to the left direction is entered, and selects a sound elimination mode when a gesture diverted to the right direction is entered. If a gesture in the upward direction is entered without being diverted to the left or right direction, then the controller 180 can transfer the selected contents without selecting a particular play mode.

Furthermore, the controller 180 analyzes the direction of the user's drag input received through a touch screen, and selects a sound elimination mode when the drag direction is a direction toward the camera, and selects a vide elimination mode when the drag direction is a direction toward the microphone.

Figure 14:
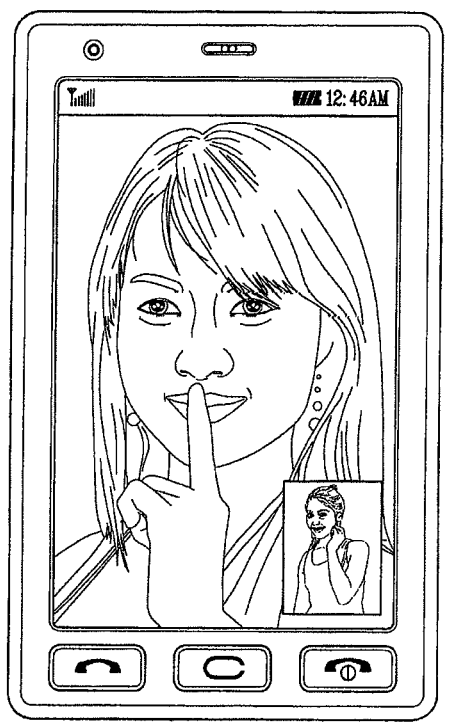

FIG. 14 is a view illustrating a method of selecting a play mode of contents using a camera or microphone.

The controller 180 analyzes the information received through the camera 121 and/or microphone 122 to select the corresponding play mode according to a motion taken by the user and/or a voice uttered by the user. For example, as illustrated in FIG. 14, if the user takes a motion by putting his or her finger to his or her mouth along with a voice "Shh", then the controller 180 analyzes his or her motion and voice to select a sound elimination mode corresponding to the user's motion.

Figure 15:
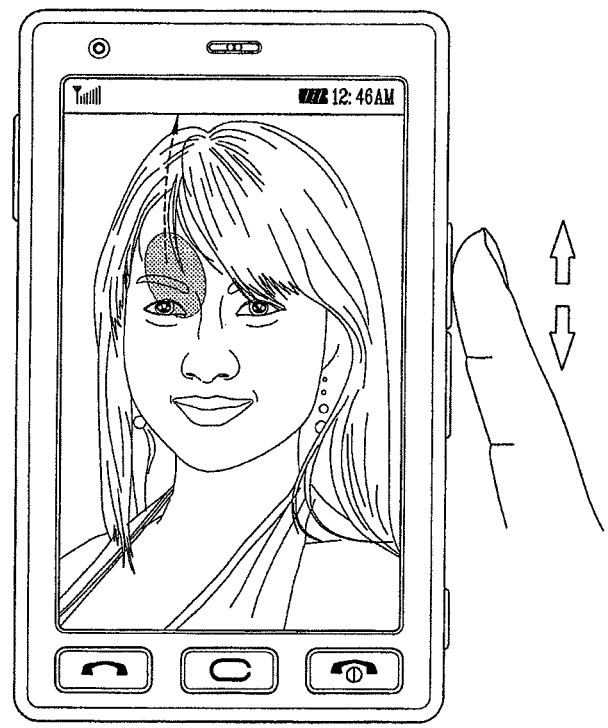

FIG. 15 is a view illustrating a method of selecting a play mode of contents using a sound volume control key.

If a sound volume control key 132 is entered together with the user's input (or without the user's input) (for example, a drag input in the upward direction) for transferring contents being reproduced (selected) to the external terminal 200 while reproducing the contents in the terminal 100, then the controller 180 changes a size of the volume of contents to be transferred in proportion to the time period or number of times of inputting the sound volume control key in an increasing or decreasing manner. Furthermore, if the sound volume control key is received for more than a predetermined period of time, then the controller 180 may select a sound elimination mode or maximum volume transfer method according to the direction of the sound volume control key 132.

Figure 16:
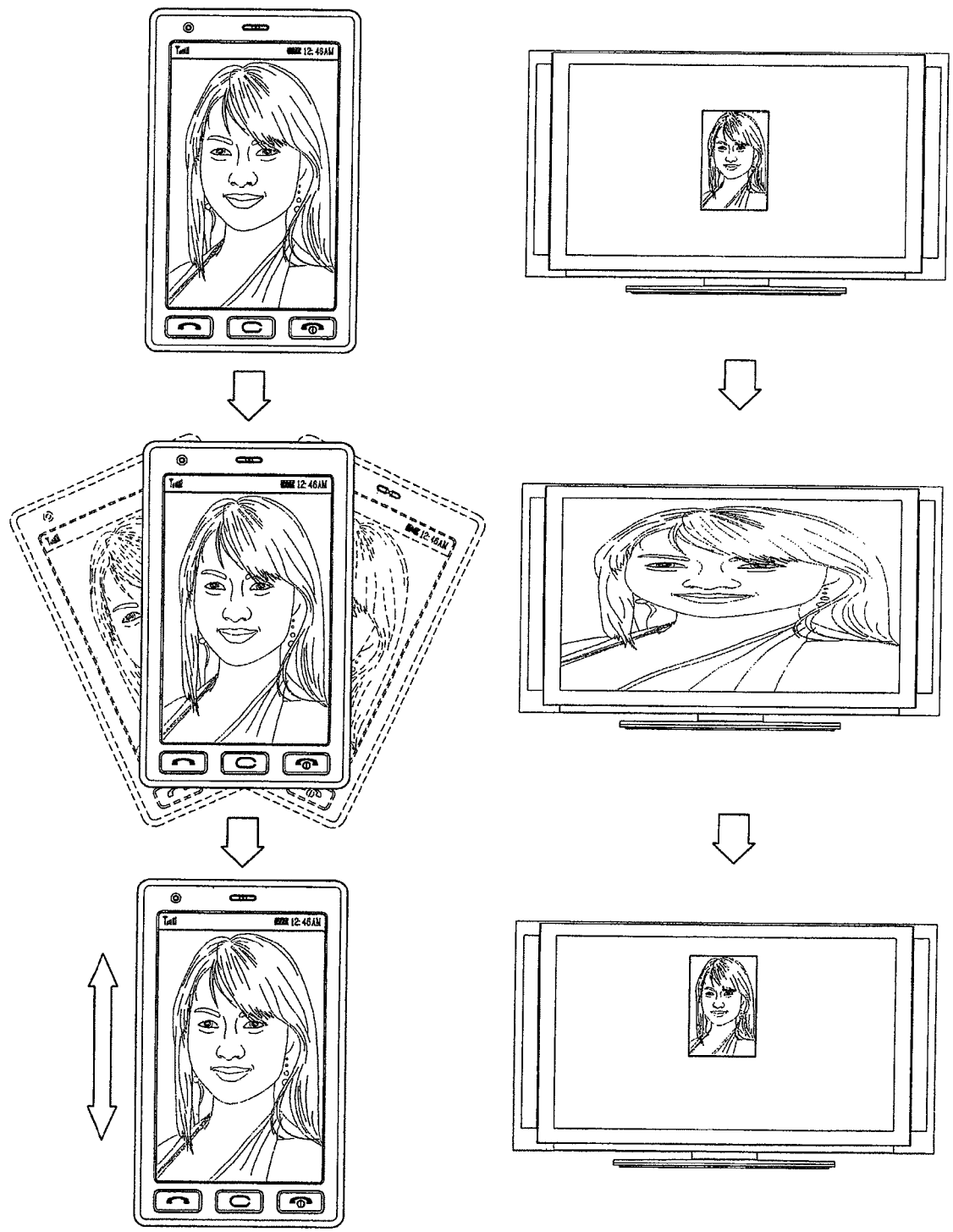

FIG. 16 is a view illustrating a method of selecting a play mode of contents using a motion sensor. The controller 180 identifies the user's motion through a motion sensor, and selects a play mode according to the identified user's motion. For example, if the user shakes the terminal 100 to the left/right, then the controller 180 can change a size of the video of contents according to the size of a display region of the external terminal 200. Furthermore, if the user shakes the terminal 100 upward or downward, then the controller 180 may control the video to be displayed as the original size of the contents video. Furthermore, the controller 180 may enlarge or reduce a size of contents video in proportion to the direction, time, number of times, or strength, of shaking the terminal 100. For example, the video of contents displayed on the external terminal 200 is enlarged at a predetermined ratio (for example, 10%) whenever shaking it once in the left/right direction, and the video of contents displayed on the external terminal 200 is reduced at a predetermined ratio (for example, 10%) whenever shaking it once in the upward/downward direction.

Furthermore, according to an embodiment of the present invention, the foregoing method may be implemented as codes readable by a computer on a medium written by the program. Examples of the computer-readable media may include ROM, RAM, CD-ROM, magnetic tape, floppy disk, and optical data storage device, and the like.

According to a mobile communication terminal having an electronic paper and a control method applied thereto as described above, the configurations and methods according to the above-described embodiments will not be applicable in a limited way, and all or part of each embodiment may be selectively combined and configured to make various modifications thereto.

As described above, preferred embodiments of the present invention have been described with reference to the accompanying drawings. Here, the terms and words used herein and the claims should not be construed by limiting to their typical or lexical meaning, but should be construed based on the meaning and concept conforming to the technical spirit of the present invention.

What is claimed is:

1. A mobile terminal, comprising:
   a display unit;
   a wireless communication unit configured to form a network between the mobile terminal and an external terminal; and
   a controller configured to:
   display on the display unit, a corresponding area of a first display region of the external terminal based on information of the first display region of the external terminal,
   display a first icon corresponding to an application being executed at the same time on the mobile terminal or a second icon corresponding to an application being executed on the external terminal,
   set up at least two second display regions on the first display region of the external terminal based on a touch input into the corresponding area and the first icon or the second icon,
   display the at least two second display regions simultaneously on the first display region of the external terminal,
   control the wireless communication unit to transmit, to the external terminal, information about the at least two second display regions of the external terminal and a content of the application to display on the at least two second display regions,
   receive an event in a state that the mobile terminal is connected to the external terminal, the event is occurring in the mobile terminal,
   set up a third display region of the external terminal for displaying event information, and
   transfer the event information to the external terminal.

2. The mobile terminal of claim 1, wherein the controller is configured to create the at least two second display regions of the external terminal by dividing the first display region of the external terminal based on one of a number of contents, a content attribute, and a user input.

3. The mobile terminal of claim 1, wherein the controller is configured to receive a user input from a key displayed on the display unit of the mobile terminal, the key configured to select a number and an arrangement of the at least two second display regions of the external terminal.

4. The mobile terminal of claim 1, wherein the information about the at least two second display regions of the external terminal comprises at least one of a region size, a region arrangement, content to be displayed, a content play mode, and an application.

5. The mobile terminal of claim 1, wherein the controller is configured to
   receive and check a size of the first display region of the external terminal, and
   determine a size and an arrangement of each of the at least two second display regions of the external terminal according to one of a number of contents, a content attribute and a user input based on the checked size of the first display region of the external terminal.

6. The mobile terminal of claim 1, wherein the controller is configured to
   control the display unit of the mobile terminal to display overlapped regions corresponding to the at least two second display regions of the external terminal, and
   arrange the overlapped regions based on a priority.

7. The mobile terminal of claim 1, wherein the controller is configured to
   in response to a touch input to one of the regions displayed on the display unit of the mobile terminal, control the display unit of the mobile terminal to display a list of contents being executed or contents executable on the at least two second display regions of the external terminal.

8. The mobile terminal of claim 1, wherein the controller is configured to control content that has been displayed on the first display region of the external terminal or content that has been displayed on the display unit of the mobile terminal to be seamlessly displayed on one of the at least two second display regions of the external terminal.

9. The mobile terminal of claim 1, wherein the controller is configured to control the wireless communication unit to receive a notification of an event that has occurred in the external terminal.

10. The mobile terminal of claim 1, wherein the controller is configured to change or reconfigure any one of a size, an arrangement and a number of the at least two second display regions of the external terminal when an event is generated or notified.

11. The mobile terminal of claim 1, wherein the event is one of
   a change of a number of contents for displaying on the external terminal;
   a change of a content attribute;
   an input from the user;
   a message reception;
   a voice call reception; and
   a video call reception.

12. The mobile terminal of claim 1, wherein the second icon corresponds to the application being executed according to the event generated.

13. The mobile terminal of claim 1, wherein content transmitted by the mobile terminal is displayed on one of the at least two second display regions of the external terminal or content downloaded from a server according to the contents information transmitted by the mobile terminal is displayed on one of the at least two second display regions of the external terminal.

14. The mobile terminal of claim 1, further comprising:
a user input unit operatively connected to the controller,
wherein the controller is configured to control the wireless communication unit to
extract a play mode corresponding to sound or video outputted when reproducing contents to be displayed on the first display region of the external terminal or one of the at least two second display regions of the external terminal based on information received through the user input unit, and
transmit the extracted play mode to the external terminal.

15. The mobile terminal of claim 14, wherein the play mode is any one of a sound elimination mode, a video elimination mode, a sound volume control method, and a video size control method.

16. The mobile terminal of claim 14, wherein the received information is a gesture received through a touch sensor, a gesture received through a motion sensor or a gesture received through a camera, or a voice received through a microphone.

17. The mobile terminal of claim 14, wherein the controller is configured to control the extracted play mode to be synchronized with the sound or video of the contents displayed on the external terminal.

18. A method of sharing contents in a mobile terminal, the method comprising:
forming a network between the mobile terminal and an external terminal;
displaying on the display unit, a corresponding area of a first display region of the external terminal based on information of the first display region of the external terminal;
displaying a first icon corresponding to an application being executed at the same time on the mobile terminal or a second icon corresponding to an application being executed on the external terminal;
setting up at least two second display on the first display region of the external terminal based on a touch input into the corresponding area and the first icon or the second icon;
displaying the at least two second display regions simultaneously on the first display region of the external terminal;
controlling a wireless communication unit to transmit, to the external terminal, information about the at least two second display regions of the external terminal and a content of the application to display on the at least two second display regions;
receiving an event in a state that the mobile terminal is connected to the external terminal, the event is occurring in the mobile terminal;
setting up a third display region of the external terminal for displaying event information; and
transferring the event information to the external terminal.

19. The method of claim 18, wherein the information about to the at least two second display regions of the external terminal comprises any one of a region size, a region arrangement, a content to be displayed, a content play mode, and an application.

20. The method of claim 18, wherein said setting step comprises:
receiving and checking a size of the first display region of the external terminal; and
determining a size and an arrangement of each of the at least two second display regions of the external terminal according to one of a number of contents, a content attribute, and a user input based on the checked size of the first display region of the external terminal.

21. The method of claim 18, further comprising:
receiving a notification of an event that has occurred in the external terminal.

22. The method of claim 18, further comprising:
changing or reconfiguring any one of a size, an arrangement and a number of the at least two second display regions of the external terminal when the event is generated.

23. The method of claim 18,
wherein the second icon corresponds to the application being executed according to the event generated.

24. The method of claim 18, further comprising:
receiving information through a user input unit; and
extracting a play mode corresponding to sound or video outputted when reproducing contents to be displayed on the first display region of the external terminal or one of the at least two second display regions of the external terminal based on the received information.

25. The method of claim 24, wherein the play mode is any one of a sound elimination mode, a video elimination mode, a sound volume control method, and a video size control method.

26. The method of claim 24, wherein the received information is a gesture received through a touch sensor, a gesture received through a motion sensor or a gesture received through a camera, or a voice received through a microphone.

27. The mobile terminal of claim 1,
wherein the mobile terminal comprises a memory, and
wherein, if the external terminal has not been previously connected to the mobile terminal, the controller is configured to save the information of the first display region of the external terminal in the memory, and
wherein, if the external terminal has been previously connected to the mobile terminal, the controller is configured to retrieve the previously received and saved information of the first display region of the external terminal from the memory.

28. The mobile terminal of claim 1, wherein the controller is further configured to, in response to the one or more user drag inputs, resize the at least two second correspondence regions of the mobile terminal to allow one or more additional correspondence regions to be displayed on the mobile terminal.

29. The mobile terminal of claim 28, wherein the controller is further configured to, in response to at least one user drag input to at least one of the two second correspondence regions and the additional correspondence regions, remove the at least one correspondence region and change a layout of remaining correspondence regions.

* * * * *